United States Patent [19]

Graham et al.

[11] Patent Number: 5,089,214
[45] Date of Patent: Feb. 18, 1992

[54] APPARATUS FOR MONITORING THE PRESSURE WITHIN A CASK CONTAINING RADIOACTIVE MATERIAL

[75] Inventors: Kingsley F. Graham, Murrysville; John B. Lipchak, Forest Hills, both of Pa.

[73] Assignee: Westinghouse Electric Corp., Pittsburgh, Pa.

[21] Appl. No.: 558,996

[22] Filed: Jul. 26, 1990

[51] Int. Cl.$^5$ ............................................. G21C 17/00
[52] U.S. Cl. .................................... 376/250; 376/272; 73/49.2
[58] Field of Search ...................... 376/250, 256, 272; 73/52, 49.2, 49.3, 40; 250/506.1, 507.1

[56] References Cited

U.S. PATENT DOCUMENTS

| | | | |
|---|---|---|---|
| 3,100,986 | 8/1963 | Starr et al. | 73/40 |
| 3,982,134 | 9/1976 | Housholder et al. | 376/272 |
| 4,126,034 | 11/1978 | Conrad | 73/49.2 |
| 4,278,892 | 7/1981 | Baatz et al. | 250/506.1 |
| 4,427,893 | 1/1984 | Queiser et al. | 250/506.1 |
| 4,445,042 | 4/1984 | Baatz et al. | 376/272 |
| 4,447,733 | 5/1984 | Baatz et al. | 376/272 |
| 4,495,139 | 1/1985 | Janberg et al. | 376/250 |
| 4,983,352 | 1/1991 | Efferding | 376/250 |

FOREIGN PATENT DOCUMENTS

| | | |
|---|---|---|
| 31048 | 7/1981 | European Pat. Off. |
| 49439 | 4/1982 | European Pat. Off. |
| 2166680 | 1/1989 | United Kingdom |

Primary Examiner—Daniel D. Wasil
Attorney, Agent, or Firm—Z. L. Dermer

[57] ABSTRACT

An apparatus for monitoring the pressure within a cask containing radioactive materials is disclosed. The apparatus comprises a differential pressure sensor sealingly connected to a bore that penetrates through the wall of the cask for directly monitoring the pressure of the helium gas contained within the cask and for providing a first barrier between the helium gas and the ambient atmosphere. An evacuated sensor chamber surrounds both the outlet end of the through-wall bore and the differential pressure sensor for providing a second barrier between the helium and the ambient atmosphere as well as a vacuum reference point for the differential pressure sensor. An absolute pressure sensor is connected in parallel to the through-wall bore to allow the system operator to determine whether or not a reduction in the pressure sensed by the differential pressure sensor is the result of a leakage condition in the cask, or in the evacuated sensor chamber. The pressure monitoring apparatus allows direct pressure readings to be taken within the cask itself which are reliably confirmable, and further provides multiple mechanical barriers between the hazardous helium gas contained within such a cask, and the ambient atmosphere.

18 Claims, 3 Drawing Sheets

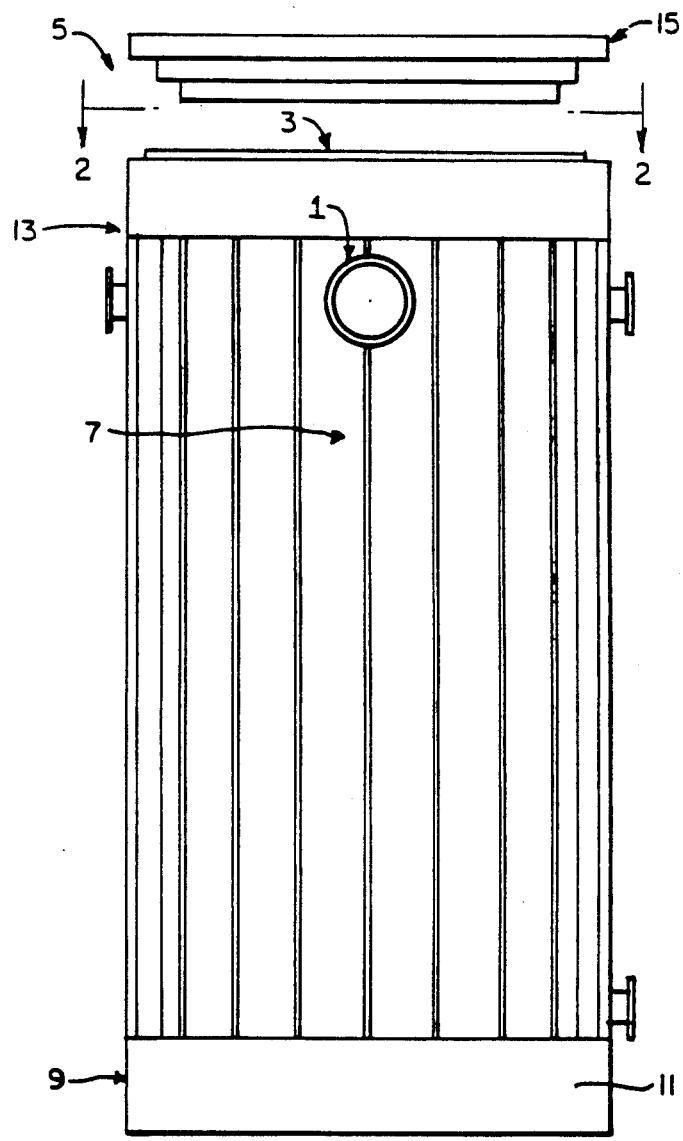
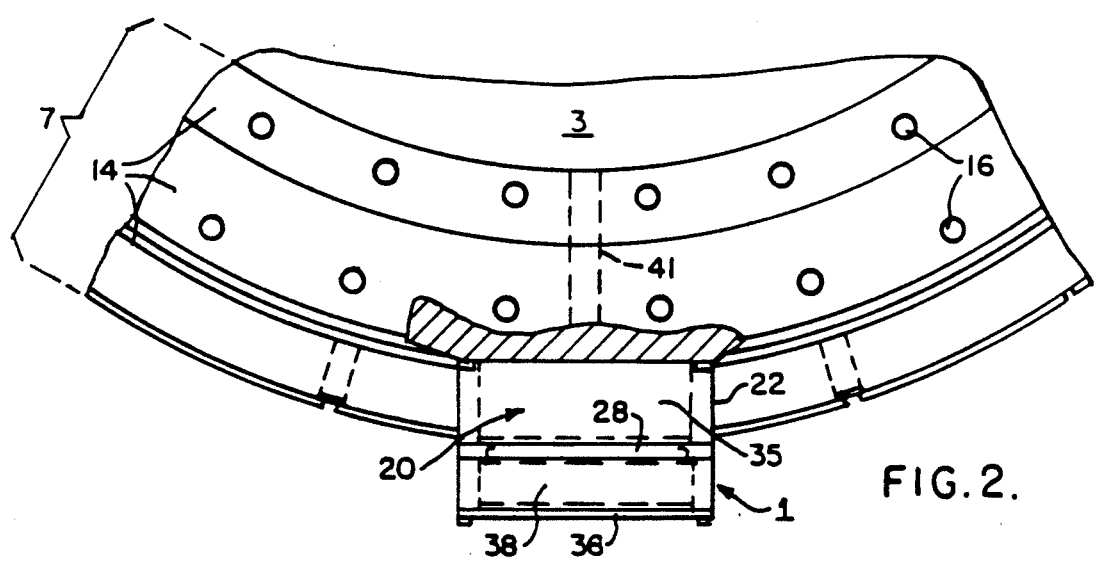
FIG.1.
FIG.2.

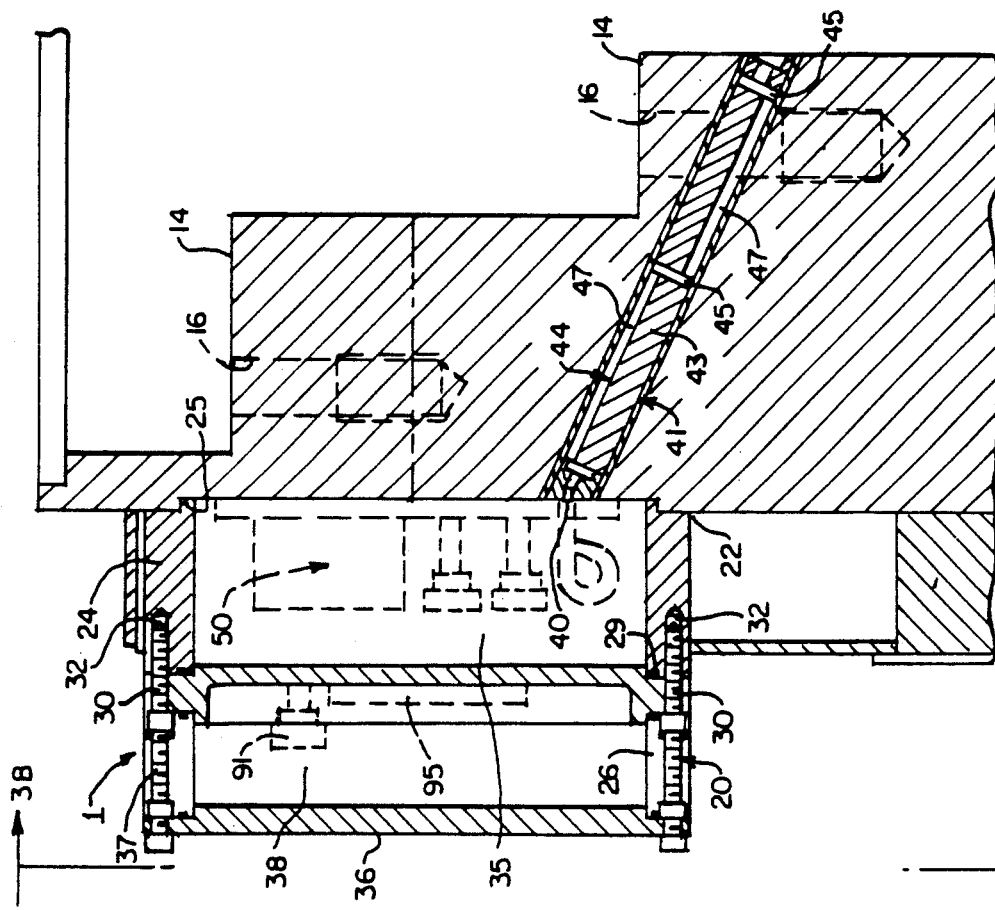

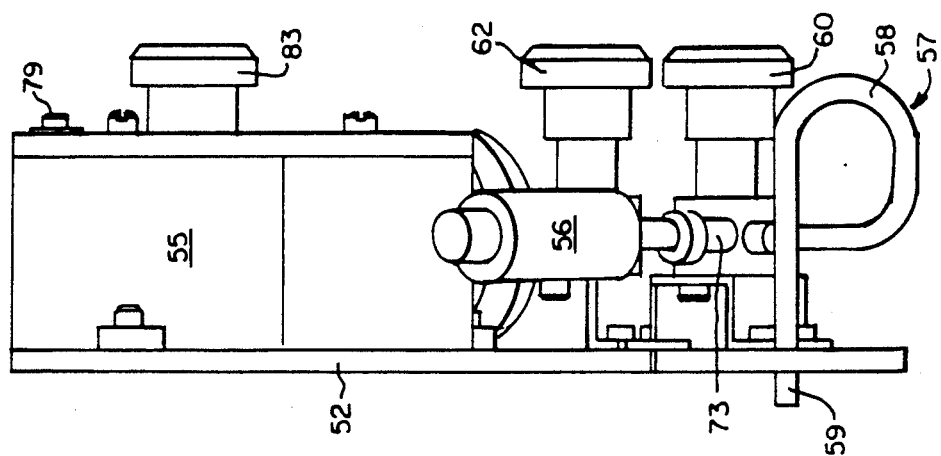
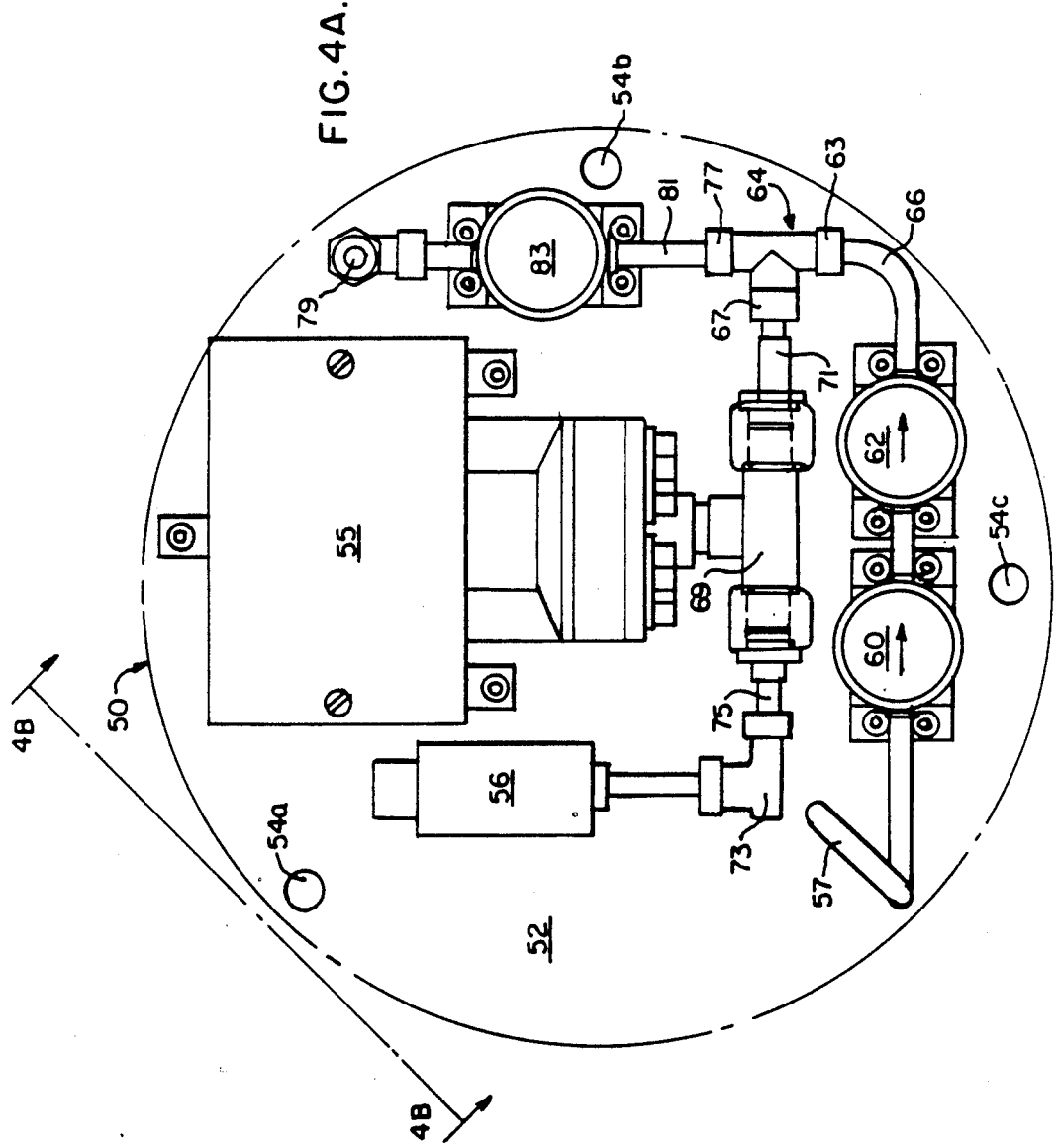

APPARATUS FOR MONITORING THE PRESSURE WITHIN A CASK CONTAINING RADIOACTIVE MATERIAL

BACKGROUND OF THE INVENTION

This invention generally relates to pressure monitors, and is specifically concerned with both an apparatus and a method for directly and reliably monitoring the pressure of helium gas within a cask containing radioactive materials.

Devices for monitoring the pressure of the helium gas that is typically present within casks used to store or transport radioactive materials are known in the prior art. One of the primary purposes of such devices is to generate a warning signal when a leakage condition occurs which would allow the pressurized helium gas contained within such casks to escape in the ambient atmosphere. There are many reasons why the persons responsible for the maintenance and operation of such casks would want to be immediately informed of such a leakage condition. First, while the helium gas itself is not harmful, the leakage of such gas might carry out very fine radioactive particulates which may in turn pose a radiation hazard. Secondly, the loss of helium gas within such casks interferes with the ability of the cask to dissipate the heat generated by the decay of the radioisotopes disposed within the cask, as helium is a far better thermal conductor than air. Thirdly, the loss of helium in the cask might imply the introduction of ambient air into the cask interior, which is potentially corrosive due to the oxygen content of air.

In one type of prior art pressure monitoring device, the space that is normally present between the inner and outer lids that cover the cask is pressurized to a higher pressure than the helium gas within the cask interior. This pressurized space is connected to a differential pressure switch that monitors the pressure difference between the gas in the cask and the gas in the space. A second switch monitors the pressure in the pressurized space between the inner and outer lids, and is used to determine whether or not a change in the differential pressure between the cask interior and the pressurized space is the result of a leak in the seals between the cask interior and the ambient atmosphere, or a leak in the seals between the pressurized space and the ambient atmosphere.

While such prior art pressure monitoring devices are capable of fulfilling their intended purpose, the applicants have noted a number of areas in the design of these devices which could bear improvement. For example, in order to obtain access to these particular pressure monitoring devices, the lid of the cask itself must be completely removed. Such lid removal is not only troublesome in view of the size and weight of the lid, and the number of bolts used to fasten it to the cask, but further presents a radiation hazard since it results in the exposure of radioactive materials to the ambient atmosphere. Hence, whenever it becomes necessary to perform a maintenance operation or to replace a component in one of these prior art pressure monitoring devices, the cask must be moved into an area of containment, the heavy lid removed, and either the radioactive materials disposed inside must be removed, or the maintenance or replacement operation must be done remotely through the use of robotic tools so that maintenance personnel are not exposed to potentially harmful radiation. Still another shortcoming in the design of such prior art pressure monitoring devices is the fact that there is no practical way to test the operability of the pressure sensors once the cask is sealed, or to confirm the reliability of the pressure readings generated by the two pressure sensors when these sensors indicate that a leakage condition has occurred. Hence, if one or more of the pressure switches generates a spurious leakage signal as a result of drift in its set point or some other malfunction, the entire cask might be put through some unnecessary and expensive repair operation. Still a third shortcoming in the design of such prior art pressure monitoring devices is the fact that neither of the pressure switches makes a direct measurement of the actual pressure of the pressurized helium gas inside the cask. The lack of any such direct measurement adversely effects the reliability of the pressure readings generated by the switches.

Clearly, what is needed is an improved pressure monitoring device which is easily accessible in the event that a repair or a maintenance operation is necessary, but yet does not adversely effect the shielding efficacy of the cask as a whole. Ideally, the readings of such a pressure monitoring device should be readily testable at any time during the operation of the device, and should be further verifiable in the event that a signal indicative of a leakage condition is generated. Finally, such a device should directly measure the pressure of the gas disposed within the cask without compromising the gas seals in the cask so that the output of the device may be as accurate and as reliable as possible.

SUMMARY OF THE INVENTION

The invention is both an apparatus and method for monitoring the pressure within a cask containing a hazardous gas that eliminates or at least ameliorates the aforementioned shortcomings of the prior art. Specifically, the invention is an apparatus that comprises a differential pressure sensor sealingly connected to an outer end of a bore that penetrates through a wall of the cask for both directly measuring the pressure of the hazardous gas and providing a first barrier between the gas and the ambient atmosphere, and an evacuated sensor chamber that contains the outer end of the through-wall bore as well as the differential pressure sensor for providing a second barrier between the gas and the ambient atmosphere. Preferably, the apparatus further comprises an absolute pressure sensor that is connected in parallel to the through-wall bore so that, in the event that the differential pressure sensor indicates a leak condition has occurred, the system operator may determine whether or not the leakage condition sensed is a result of a leakage condition in the cask, or in the evacuated sensor chamber. Both sensors may be switches.

A wall of the evacuated sensor chamber may further include a test port coupling, and the apparatus may further comprise an auxiliary pressure sensor that is detachably and sealingly connectable to the test port coupling for measuring the pressure within the sensor chamber such a measurement may be made through the test port coupling in the event that the absolute pressure sensor indicates that the loss of differential pressure sensed by the differential pressure sensor is a result of leakage in the evacuated sensor chamber. Such a direct pressure measurement would either confirm that the leakage condition arose as a result of a leak in the evacuated pressure sensor, or would indicate that the leakage condition was a false alarm caused by a faulty differential pressure sensor.

To facilitate the replacement of either the differential or the absolute pressure sensor, the evacuated sensor chamber is defined in part by a removable outer cover. Additionally, both the differential and the absolute pressure sensors may be connected to the aforementioned through-wall bore in the walls of the cask by means of a gas-conducting conduit which in turn includes at least one isolation valve for isolating the through-wall bore from the pressure sensors during a pressure sensor replacement operation. As an added safety measure in the event that a pressure sensor replacement operation become necessary, the apparatus may further include a venting assembly in the gas conducting conduit between the previously mentioned isolation valve, and the inputs of both the differential pressure sensor and the absolute pressure sensor. This venting assembly may include a vent port, and a vent valve fluidly connected within the segment of the gas-conducting conduit that connects the isolation valve to the inputs of the differential and absolute pressure sensors.

Both the differential pressure sensor and the absolute pressure sensor generate electrical signals corresponding to a pressure output that are transmitted through wires which extend through the removable cover of the evacuated sensor chamber through a sealed electrical penetration. These wires are in turn connected to an electrical connector assembly or socket that is mounted in a hole in the housing of the pressure monitoring assembly. An output cable having a plug which is receivable within the socket transmits the electrical signals generated by the differential and absolute pressure sensors to an appropriate monitoring circuit, which converts these signals into pressure values and which is programmed to generate an alarm signal upon the receipt of a pressure signal indicative of a leakage condition.

The apparatus provides a highly reliable system whose outputs are directly and reliably confirmable at all times during the operation of the device, and whose structure provides multiple safeguards against the release of any hazardous gases into the ambient atmosphere.

BRIEF DESCRIPTION OF THE SEVERAL FIGURES

FIG. 1 is a side view of a cask for the storage and transportation of radioactive materials with the apparatus of the invention installed on the upper most portion of the wall of the cask;

FIG. 2 is a partial plan view of the walls of the cask illustrated in FIG. 1 along the line 2—2;

FIG. 3A is a side, cross-sectional view of the apparatus of the invention, illustrating how the housing of the apparatus is attached to an upper portion of the walls of the cask illustrated in FIG. 1;

FIG. 3B is a front view of the apparatus illustrated in FIG. 3A along the line 3B—3B, illustrating the components of the sensor assembly that are mounted on the removable inner cover of the housing;

FIG. 4A is a front view of the sensor assembly that is disposed in the evacuated chamber defined in the bottom portion of the housing of the apparatus, and FIG. 4B is a side view of the sensor assembly illustrated in FIG. 4A along the line 4B—4B.

DETAILED DESCRIPTION OF THE PREFERRED EMBODIMENT

With reference now to FIGS. 1 and 2, the principal purpose of the pressure monitoring apparatus 1 of the invention is to monitor the pressure of the helium gas contained within the interior 3 of a cask 5 used to either store or to transport radioactive materials. Such helium is typically pressurized to approximately 1.5 atmospheres, and serves the two-fold purpose of enhancing the expulsion of heat out of the cask 5 generated by the decay-down of the radioactive materials contained therein, and further retarding the occurrence of corrosion within the cask interior 3. Such casks 5 generally comprise a cylindrical wall 7 whose lower portion 9 includes a floor plate 11 welded therearound, and whose upper portion 13 includes a stepped rim 14 for receiving a lid assembly 15. The stepped rim 14 includes a plurality of uniformly-spaced bolt holes 16 for receiving bolts (not shown) that secure the lid assembly 15 into sealing engagement with the stepped rim 14 of the cask 5. While the pressure monitoring apparatus 1 of the invention may be used in conjunction with any transportation and storage cask, the cask illustrated in this example of the invention is a peripheral-finned transportation and storage cask of the type disclosed and claimed in U.S. Pat. No. 4,997,618, and assigned to the Westinghouse Electric Corporation.

With reference now to FIGS. 2, 3A and 3B, the pressure monitoring apparatus includes an annular housing 20 whose inner edge is disposed within an annular recess 22 in the upper portion 13 of the wall 7 of cask 5. The housing 20 includes an lower annular member 24 whose inner edge 25 is welded around the recess 22 to form a gas-tight seal. The housing 20 further includes an upper annular member 26 disposed over the outer edge of the lower annular member 24 as shown. A removable inner cover 28 is disposed between the outer edges of the lower annular member 24, and the inner edges of the upper annular member 26. A gasket 29 is disposed between the inner edge of the inner cover 28 and the outer edge of the lower annular member 24, and a plurality of bolts 30 compresses the inner edge of the inner cover 28 in gas-tight relationship with this gasket 29. These bolts 30 are screwed into threaded bores 32 present around the circumference of the lower annular member 24.

Together, the recess 22, the lower annular member 24 and the removable cover 28 define an evacuated sensor chamber 35 within the housing 20 of the pressure monitoring apparatus 1. As will be described in more detail presently, this evacuated sensor chamber 35 contains most of the sensor assembly 50 (illustrated in phantom 3A) of the apparatus 1, and further provides a second barrier between the pressurized helium gas disposed within the interior 3 of the cask 5, and the ambient atmosphere.

With reference again to FIGS. 2, 3A and 3B, the housing 20 further includes a removable outer cover 36 that is secured to the outer edges of the upper annular member 26 by means of bolts 37. Together, the upper annular member 26, the removable inner cover 28, and the removable outer cover 36 define an access chamber 38 which contains the electrical terminals leading to the sensor assembly 50 disposed within the evacuated sensor chamber 35, as well as a test conduit that is connected to a test port which allows a direct pressure measurement to be made of the pressure within the evacuated sensor chamber 35.

With specific reference now to FIG. 3A, the evacuated sensor chamber 35 surrounds the outer end 40 of a bore 41 that penetrates completely through the cylindrical wall 7 of the cask 5. A shielding insert 43 is disposed within the bore 41 to prevent "streaming" of any radiation which may be emitted by radioactive materials disposed within the interior 3 of the cask 5. The principal purpose of the shielding insert 43 is to define tortuous path 44 which may be easily traversed by the compressed helium within the interior 3 of the cask 5, but which does not provide a straight path for any radiation emanating from the interior 3 of the cask 5. This tortuous path 44 is defined by a combination of intercommunicating radially disposed bores 45 and longitudinally disposed bores 47 as shown. While it is within the scope of the instant invention that the through-wall bore 41 might be placed in positions other than the upper portion 13 of the cylindrical wall 7 of the cask 5, the upper portion 13 is preferred due to the fact that the density of radiation emanating out of the cask interior 3 is considerably less at the upper portion 13 of the cask than it is in the middle portion, since the uppermost height of the radioactive material in the cask is always below the stepped rim 14. While such a low density of radiation is also present near the lower portion 9 of the cask 5, this location is not preferred to two reasons. First, a lower location of the housing 20 of the pressure monitoring apparatus 1 on the cask wall 7 renders it more exposed to mechanical shock from fork lifts, etc., when the cask 5 is being handled. Secondly, if any significant amount of liquid should accumulate within the cask interior 3, these liquids might flow up through the bore 41, and damage the components of the sensor assembly 50 disposed therein.

With reference now to FIGS. 4A and 4B, the sensor assembly 50 of the apparatus generally includes a mounting plate 52 having three bolt holes 54a,b,c for receiving bolts (not shown) when the assembly 50 is mounted within the evacuated sensor chamber 35 of the housing 20. The two key components of the sensor assembly 50 are a differential pressure sensor 55, and an absolute pressure sensor 56, each of which are secured (either directly or indirectly) to the mounting plate 52. In the preferred embodiment, the differential pressure sensor is an Aschcroft ® Model No. B427S XG9 differential pressure sensor manufactured by Dresser Industries located in Milford, Conn., having a stainless steel diaphragm and a setpoint of up to 30 psi (differential). The absolute pressure sensor 6 is preferably a model no. 211-75-700 pressure sensor Corporation located in Seattle, Wash.

A conduit 57 connects both the differential pressure sensor 55 and the absolute pressure sensor 56 in parallel to the outer end 40 of the through-wall bore 41. The conduit 57 includes an intake tube 58 whose upstream end 59 is brazed or welded to the outer end 40 of the through-wall bore 41, and whose downstream end is connected to two-serially connected isolation valves 60 and 62. In the preferred embodiment, isolation valves 60 and 62 (as well as all of the other isolation valves 83 and 91 discussed later) are preferably model no. SS-4H-TW "H" Series, bellows-type valves manufactured by the Nupro Company located in Willoughby, Ohio. The purpose of the isolation valves 60 and 62 is to completely isolate both the differential pressure sensor 55 and the absolute pressure sensor 56 from the outer end 40 of the through-wall bore 41 in the event that either of these two components requires replacement or maintenance. While one such isolation valve would be adequate for this purpose, two serially-connected valves 60 and 62 are preferred due to the extra measure of safety that the use of two valves provides against leakage during a replacement operation. The outlet of the second isolation valve 62 is connected to the inlet 63 of a T fitting 64 by way of a tube elbow 66 as shown.

The first outlet 67 of the T fitting 65 is connected to another T coupling 69 which fluidly connects the differential pressure sensor 55 to the gas conduit 57. For this purpose, a conduit segment 71 is disposed between the first outlet 67 of the T fitting 64, and the T coupling 69. On its downstream side, the T coupling 69 is connected to an elbow coupling 73 which in turn leads to the absolute pressure sensor 56, thereby connecting absolute pressure sensor 56 to the gas conducting conduit 57. A conduit segment 75 interconnects the downstream side of the T coupling 69 and the elbow coupling 73 in the manner shown.

The second outlet 77 of the T fitting 64 ultimately leads to a vent plug 79 by way of a conduit segment 81. Conduit segment 81 further includes a vent valve 83 which, in the preferred embodiment, is the same type of isolation valve as described with respect to valve 60 and 62. The purpose of the vent plug 79, conduit segment 81 and vent valve 83 is to provide a controlled venting of any gas trapped between the isolation valve 62 and the differential and absolute pressure sensors 55 and 56 in the event that either of these two components requires maintenance or replacement. More specifically, the provision of these vent components allows any helium that contains radioactive particulate material to be sucked out of the segment of the gas conducting conduit 57 disposed between the isolation valve 62 and the pressure sensors 55 and 56 prior to the de-coupling of these sensors 55 and 56 from their respective fittings 69 and 73.

The balance of the components that form the sensor assembly 50 are mounted on the outer surface of the removal inner cover 28, and are illustrated in FIG. 3B. These components include a chamber pressure test port 85 (indicated partially in phantom) which in turn is welded or brazed in a gas-tight relationship to a testing conduit 87 that terminates in a test cap 89. The testing conduit 87 preferably includes an isolation valve 91 of the same type as previously described with respect to the isolation valve 60 and 62. The purpose of the test port 85, testing conduit 87, test cap 89 and isolation valve 91 is to allow the system operator to make a direct measurement of the pressure of the evacuated sensor chamber 35 for the purpose of confirming whether or not a chamber leakage signal generated by the pressure sensors 55 and 56 is the result of a true leakage condition within the chamber 35, or is merely the result of a defective sensor 55, 56. The removable inner cover further includes a sealed electrical penetration 93 which conducts the output signal-carrying cables from the pressure sensors 55 and 56 to a terminal block 95 which in turn is connected to an electrical socket assembly 97 through connecting wires 98. The electric socket assembly 97 receives the plug 98.5 of a monitor cable 99 as shown. This monitor cable 99 is connected to commercially-available read-out circuitry (not shown) which converts the electrical signals generated by the differential and absolute pressure sensors 55, 56 into pressure readings.

The final component of the sensor assembly 50 is an auxiliary pressure sensor 100 (indicated in phantom)

which is detachably connectable to the testing conduit 87 after the test cap 89 has been removed. The provision of the auxiliary absolute pressure sensor 100 allows the operator of the apparatus to make a direct measurement of the pressure within the evacuated sensor chamber 35 when such a measurement becomes desirable.

In operation, the differential pressure sensor 55 continuously generates an electrical signal indicative of the absolute pressure of the helium disposed within the cask interior 3, since the chamber 35 that surrounds the differential pressure sensor 55 is evacuated. As the helium disposed within the interior 3 of such cask 5 is typically pressurized to about 1.5 atmospheres, the output of this sensor 55 will generally read 1.5 atmospheres. Because the absolute pressure sensor 56 is in fact only a differential pressure sensor that uses it own, self-contained evacuated chamber as a reference point for making pressure measurements, the absolute pressure sensor 56 should likewise continuously generate a signal indicative of a pressure reading of 1.5 atmospheres. However, in the event that a leakage condition should occur in either the cask 5, or in the evacuated sensor chamber 35 that surrounds the differential pressure sensor 55, the sensor 55 will begin to generate a signal indicative of the presence of a lower pressure. In the preferred method of the invention, the circuitry (not shown) connected to the output of the differential pressure sensor 55 is programmed to generate an alarm signal when the differential pressure measured falls to about 1.2 atmospheres or lower. When this occurs, the operator of the apparatus immediately checks the pressure read-out generated by the absolute pressure sensor 56. If this pressure sensor 56 likewise indicates a pressure read-out of 1.2 atmospheres or lower, then the system operator concludes that a leakage condition has occurred with respect to the cask 3. If, however, the pressure read-out of the absolute pressure sensor 56 has not fallen and is still substantially at a level of approximately 1.5 atmospheres, then the operator of the apparatus tentatively concludes that a leakage condition has occurred with respect to the evacuated sensor chamber 35.

The next step of the method of the invention, the operator of the apparatus confirms whether or not a leakage condition has occurred with respect to the evacuated sensor chamber 35 by removing the outer cover 36, and the test cap 89, and connecting the auxiliary pressure sensor 100 to the testing conduit 87. Once this has been accomplished, the isolation valve 91 is opened. If the resulting pressure reading is 0.30 atmospheres or higher, then the system operator concludes that a leakage condition with respect to the evacuated sensor chamber 35 has, indeed, occurred. If on the other hand the auxiliary pressure sensor 100 indicates that the evacuated sensor chamber 35 is still substantially evacuated, then the operator of the apparatus 1 concludes that the output of the differential pressure sensor 55 is in error, either as the result of drift in its set point, or some other type of mechanical failure. In either case, the operator of the apparatus 1 proceeds to either repair or replace the differential pressure sensor 55 by first removing removable inner cover 28, and then closing the isolation valves 60 and 62, and then effecting a controlled venting of any helium gas disposed within the section of the gas-conducting conduit 57 by removing the vent plug 79, connecting a suction hose to the vent port, and then opening the vent valve 83. After the venting operation has been accomplished, not only is the differential pressure sensor 55 removed and repaired, but the absolute pressure sensor 56 is tested to make sure that the read-out generated thereby is accurate and correct. After the foregoing maintenance operations have been accomplished, the apparatus 1 is reassembled, and placed back into operation.

I claim:

1. An apparatus for monitoring the pressure within a cask containing a potentially hazardous gas, wherein said cask includes a bore that penetrates through one of its walls, comprising:
    a differential pressure sensor fluidly connected to an outer end of said bore for both monitoring the pressure of said hazardous gas and providing a first barrier between said gas and the ambient atmosphere,
    a sensor chamber containing the outer end of said bore and said pressure sensor for providing a second barrier between said gas and said ambient atmosphere, said chamber being at least partially evacuated to create a pressure differential between said chamber and the ambient atmosphere, and
    an absolute pressure sensor that communicates with said bore and is contained within said chamber for determining whether or not a reduction in the pressure sensed by the differential pressure sensor is the result of a leakage condition in the cask of in the chamber.

2. An apparatus for monitoring as defined in claim 1, further comprising a connecting conduit for fluidly and sealingly connecting said bore to said differential pressure sensor, and at least one isolation valve means in said conduit for selectively isolating said differential pressure sensor from said bore.

3. An apparatus for monitoring as defined in claim 2, further comprising a vent conduit connected at one end to said connecting conduit downstream of said isolation valve means, and including a vent valve means for selectively venting hazardous gas present in the connecting conduit between said isolation valve means and said differential pressure sensor.

4. An apparatus for monitoring as defined in claim 1, wherein said sensor chamber includes a removable cover for providing access to the differential pressure sensor disposed within said chamber.

5. An apparatus for monitoring as defined in claim 1, wherein a wall of said sensor chamber includes a test port coupling, and said apparatus further comprises an auxiliary pressure sensor detachably and sealingly connectable to said test port coupling for measuring the pressure within said sensor chamber.

6. An apparatus for monitoring as defined in claim 5, wherein said test port coupling includes a coupling valve means for opening said coupling after said auxiliary pressure sensor has been sealingly connected to said coupling.

7. An apparatus for monitoring as defined in claim 2, wherein said connecting conduit includes two, serially-connected isolation valves.

8. An apparatus for monitoring as defined in claim 1, wherein said sensor chamber is mounted onto the exterior wall of said cask.

9. An apparatus for monitoring the pressure of a gas within a cask containing radioactive materials, wherein said gas has been pressurized, and said cask includes a bore that penetrates through one of its walls, comprising:
    a differential pressure sensor fluidly connected to an outer end of said bore in said cask for both monitoring the pressure of said gas and providing a first barrier between said gas and the ambient atmosphere, a sensor chamber sealingly mounted on a wall of said cask and containing an outer end of said bore and said pressure sensor for providing a second barrier between said gas and said ambient atmosphere, wherein said chamber has been at least partially evacuated to create a pressure differential between the chamber and the ambient atmosphere, and an auxiliary pressure sensor fluidly connectable to said sensor chamber for measuring the pressure within said sensor chamber.

10. An apparatus for monitoring as defined in claim 9, wherein said cask includes an upper portion defined by a lid assembly, and said sensor chamber is mounted in a portion of a wall of said cask immediately below said lid assembly such that the presence of said sensor chamber does not compromise the shielding efficacy of said cask.

11. An apparatus for monitoring as defined in claim 9, further including an alarm means connected to said differential pressure sensor for providing a signal to a system operator whenever the differential pressure sensed by the sensor falls below a selected value.

12. An apparatus for monitoring as defined in claim 9, further comprising an absolute pressure sensor that communicates with said bore and is contained within said chamber for determining whether or not a reduction in the pressure sensed by the differential pressure sensor is the result of a leakage condition in the cask or in the chamber.

13. An apparatus for monitoring as defined in claim 9, further comprising a connecting conduit for fluidly and sealingly connecting said bore to said differential pressure sensor, and two, serially connected isolation valve means in said conduit for selectively isolating said differential pressure sensor from said bore.

14. An apparatus for monitoring as defined in claim 13, further comprising a vent conduit connected at one end to said connecting conduit downstream of said isolation valve means, and including a vent valve means for selectively venting hazardous gas present in the connecting conduit between said isolation valve means and said differential pressure sensor.

15. An apparatus for monitoring as defined in claim 9, wherein a wall of said sensor chamber includes a test port coupling, and said auxiliary pressure sensor is detachably and sealingly connectable to said test port coupling for measuring the pressure within said sensor chamber, in order to test the operability of said differential pressure sensor.

16. An apparatus for monitoring as defined in claim 15, wherein said test port coupling includes a coupling valve means for opening said coupling after said auxiliary pressure sensor has been sealingly connected to said coupling.

17. An apparatus for monitoring as defined in claim 9, wherein said bore defines a tortuous path in order to prevent radiation streaming from occurring through said bore.

18. An apparatus for monitoring the pressure of a gas within a cask containing radioactive materials, wherein said gas is pressurized from between about 1.20 to 2.00 atmospheres, and a wall of said cask includes a bore that penetrates through said wall, comprising:

a differential pressure sensor fluidly connected to an outer end of said bore in the walls of said cask for monitoring the relative pressure of said gas with respect to the atmosphere immediately surrounding said pressure sensor;

a sensor chamber sealingly mounted on the wall of said cask and containing said outer end of said bore and said pressure sensor, wherein said chamber has been evacuated to a pressure of 0.20 atmospheres or less to increase the pressure differential between said pressurized gas and the atmosphere immediately surrounding said pressure sensor, and an absolute pressure sensor in communication with said bore and contained within said sensor chamber for determining whether or not a reduction in the pressure sensed by the differential pressure sensor is a result of a leakage condition in the cask or in the chamber.

* * * * *